Patented May 4, 1937

2,079,109

UNITED STATES PATENT OFFICE 2,079,109

MANUFACTURE OR TREATMENT OF PRODUCTS OR ARTICLES MADE OF OR CONTAINING CELLULOSE DERIVATIVES OR OTHER LACQUER BASES

Henry Dreyfus, London, England

No Drawing. Application August 22, 1932, Serial No. 629,907. In Great Britain September 26, 1931

18 Claims. (Cl. 18—54)

This invention relates to the manufacture or treatment of products or articles made of or containing cellulose derivatives or other lacquer bases, for example, natural or synthetic resins.

The invention is based on the discovery that certain cyclic compounds have a solvent or softening action upon lacquer bases, including both cellulose derivatives and natural or synthetic resins, and may be applied very widely in the arts in processes and products employing these substances. The cyclic compounds of the present invention are compounds containing a ring which consists of two free oxygen atoms and two methylene or substituted methylene groups. The general formula of the compounds is

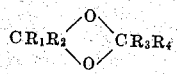

wherein $R_1$, $R_2$, $R_3$ and $R_4$ are hydrogen or aliphatic groups. These compounds will be hereinafter referred to as dimethylene ethers. The simplest compound of the series is

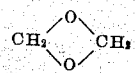

which will be hereinafter referred to as dimethylene dioxide to differentiate it from the genus of dimethylene ethers.

The dimethylene ethers of the present invention are new compounds. They may be prepared by any convenient process, but in particular I refer to the process of my U. S. application Ser. No. 593,860 filed 18th February, 1932, namely by reaction of poly-halogenated ethers with agents capable of removing halogen and introducing oxygen in its place. As stated in the said specification, oxides of metals having a relatively small affinity for oxygen or which occupy a relatively low position in the electro-potential series of the elements are especially useful for this purpose, for example litharge and mercuric, cupric and silver oxides. The starting materials for the manufacture of the dimethylene ethers of the present invention according to the process of my said specification are poly-halogenated ethers in which two halogen atoms occupy the α positions to the ether atom, for example dichlor- or di-brom-dimethyl ether, chlor-methyl-α-chlor-ethyl ether and αα′-dichlor-diethyl ether. By this means the dimethylene ethers of the invention, namely cyclic bodies containing two free oxygen atoms and two methylene or substituted methylene groups, may be produced. An alternative method for the production of the ethers consists in subjecting a corresponding aldehyde or a polymer of such an aldehyde, for example, formaldehyde or acetaldehyde, to self-etherification in presence of etherifying catalysts, for example, sulphuric acid, hydrochloric acid, phosphoric acid, ferric chloride or zinc chloride. In such processes of etherification a single aldehyde may be used or a mixture of two aldehydes, for example, a mixture of formaldehyde and acetaldehyde.

As previously indicated, the invention contemplates quite broadly processes and products utilizing the solvent or softening properties of the dimethylene ethers for cellulose derivatives and other lacquer bases. Dimethylene dioxide itself is a highly volatile compound and is therefore suitable for the volatile portion of solutions, dopes, lacquers, varnishes and the like containing cellulose derivatives or natural or synthetic resins, and also it has an extremely high solvent power for the said compounds. Thus, for instance, its solvent power for acetone-soluble cellulose acetate is higher than that of acetone itself, and, moreover, its degree of tolerance for diluents such as hydrocarbons is higher than that of acetone. Substitution of the hydrogen atoms of the methylene groups in dimethylene dioxide tends to decrease somewhat the solvent power of the product except where the substituent groups themselves confer solvent or softening properties. Thus, for instance, alkylated dimethylene dioxides, for instance 2-methyl dimethylene dioxide or 2:4-dimethyl dimethylene dioxide have in general less solvent power for acetone-soluble cellulose acetate than has dimethylene dioxide itself.

One very important aspect of the present invention consists in the application of the dimethylene ethers as solvents or softening agents in dopes, varnishes, lacquers or the like containing nitrocellulose, cellulose acetate or other esters or ethers of cellulose or natural or artificial resins, and in solutions for the manufacture of artificial filaments, ribbons, films, foils, sheets and the like by dry or wet spinning processes.

The dimethylene ethers are solvents for a wide variety of natural or synethic resins. The most important of these synthetic resins are those produced by the polymerization of vinyl compounds, for example, vinyl acetate or other vinyl compounds which may be considered to be substitution products of polyvinyl alcohol which are insoluble in water and soluble in the usual organic solvents. Other synthetic resins which may be used for the production of lacquers, varnishes and the like together with the dimethylene ethers include the fusible soluble phenol aldehyde resins, the di-phenylol propane formaldehyde type of synthetic resin, ketone phenol resins, urea or thiourea-formaldehyde resins, sulphonamide aldehyde resins and the so-called alkyde resins obtained from glycerine or other polyhydric alcohol and phthalic acid or other poly-basic acid or their anhydrides. The natural resins which may be used include all the natural resins which are customarily employed for the manufacture of lacquers and varnishes, and particularly dammar and shellac. However, the most important bases for the manufacture of the lacquers, dopes, varnishes and the like of the present invention are nitrocellulose, cellulose acetate and other esters or ethers of cellulose either alone or together with the resins previously referred to.

In the above application the methylene ethers of the present invention are particularly important as low boiling solvents, and in order to employ the compositions containing them as lacquers, dopes, varnishes and the like, it is desirable to employ the methylene ethers in conjunction with other solvents and/or diluents, and particularly medium and/or high boiling solvents or plasticizers. In spinning solutions their volatility is such that they may be used as the main volatile constituent of the spinning solution for spinning by dry spinning methods. The methylene ethers may be employed, for example, in conjunction with the following solvents:—acetone, methyl acetone, methyl ethyl ketone, methyl acetate, methyl formate, ethyl acetate, the ethers and esters and ether-esters of olefine and poly-olefine glycols, for instance the mono-methyl and ethyl ethers of ethylene and propylene glycol, ethylene glycol mono-acetate and methyl glycol mono-acetate, dioxane, methylene chloride, ethylene chloride, dichlorethylene, trichlorethylene, chloroform, methyl, ethyl or other alcohols, hydrocarbons and ethers, for example isopropyl ether, ethyl lactate, diacetone alcohol and tetrachlorethane. Some of these bodies are low boiling solvents and may be used in admixture with the dimethylene ethers of low boiling point to constitute the volatile or main volatile constituent of the solvent mixture for the manufacture of the dopes, varnishes, etc., while others are medium boilers which may stay behind in the film after the evaporation of the dimethylene ether so as to improve the properties of the film. Where very high volatility is desired acetaldehyde or other very low boiling solvents may be used, together with the dimethylene ethers and with or without other solvents as previously referred to.

In the manufacture of dopes, lacquers and the like it is desirable to have present high boiling solvents or plasticizers, for example triacetin, di-ethyl phthalate, dibutyl phthalate, sulphonamides, for example alkylated xylene sulphonamides, sulphonanilides, tartrates, for instance dibutyl or di-iso-amyl tartrate, diphenylol propane, triphenyl phosphate, tricresyl phosphate (the latter two when used to plasticize organic substitution derivatives of cellulose, preferably in conjunction with sulphonamides, tartrates or other highly compatible plasticizers), or other phenolic plasticizers. Diluents, for example toluene, xylene or other relatively cheap hydrocarbons or other non-solvents for the cellulose derivative or other lacquer base may be incorporated in the dopes, varnishes, lacquers, spinning solutions or the like within the range of tolerance of such solutions. The dopes, varnishes, lacquers, films, spinning solutions and the like may contain any other desired constituents, for example dyestuffs or coloured or white pigments. The compositions may include substances adapted to reduce flammability, for example halogenated and especially brominated organic compounds, for instance brominated acidylated aromatic amines, e. g. tribrom-acetanilide.

In the manufacture of artificial filaments, ribbons, films and the like the dimethylene ethers may be the sole solvents present in the spinning solution, or may be employed in conjunction with other solvents, for example other volatile solvents or even diluents in dry spinning operations. Thus, for instance, I may use dimethylene dioxide alone as the solvent for the manufacture of filaments from acetone-soluble cellulose acetate by the dry spinning method, or the dimethylene dioxide may be mixed with methyl or ethyl alcohol or with any other of the low boiling solvents or diluents previously mentioned. Similar conditions apply in wet spinning processes. The present invention further includes the application of the dimethylene ethers to decrease the rate of precipitation or coagulation of cellulose derivatives in the production of filaments, ribbons, films and the like by wet spinning processes. Thus, for instance, they may be employed in the coagulating bath and preferably in a relatively high concentration so that the plasticity of the filaments or other products persists for some time in the coagulating bath. Such processes are described in U. S. Patent No. 1,467,493 and U. S. applications Ser. Nos. 402,785 filed 26th October, 1929 and 418,414 filed 3rd January, 1930.

In the manufacture of plastics and moulding powders the dimethylene ethers are especially of value as volatile solvents in the working in of plasticizing agents, for example those previously mentioned, and in the working up of the products to the desired shape. The dimethylene ethers may be used for this purpose by any of the usual methods adopted in the celluloid art; for instance, the plasticizer may be dissolved in the dimethylene ether or in a mixture of the dimethylene ether with another solvent, or preferably with a non-solvent for cellulose derivatives, and the solution may be sprayed or otherwise incorporated with the cellulose derivative and the mass worked up on malaxating rolls in the customary manner.

In addition to being of value in the working up of cellulose esters and ethers and natural or artificial resins into any desired products as described above, the dimethylene ethers may also be of use for the treatment of already formed articles made of or containing the cellulose derivatives, for example filaments, yarns, threads, ribbons, films, fabrics and the like. Such treatment may have various objects. For example, the tendency of woven fabrics to slip or of warp or circular knitted fabrics to split or ladder may be diminished or eliminated by treatment with dimethylene ethers in the manner described in U. S. application Ser. No. 152,516 filed 3rd December, 1926. The dimethylene ethers may further be used to improve the pliability of extension of filaments, threads and the like made of or containing cellulose derivatives, and in particular to improve the knotting properties of comparatively thick filaments or artificial horsehair. Such treatment with the dimethylene ethers is preferably effected without tension or only under a slight tension, so that the materials are able to shrink. Shrinking of the filaments, yarns and the like either to improve their extension or their pliability is particularly important in relation to the treatment of filaments or the like of low extension produced by wet spinning processes, or filaments or the like of low extension produced by the stretching of dry spun products. Such shrinking processes are described broadly in U. S. application Ser. No. 611,240 filed 13th May, 1932.

Another very important application of the dimethylene ethers is to improve the tenacity of filaments or other products of cellulose acetate or other cellulose derivatives. In this process the filaments or other products during or subsequent to a treatment with the dimethylene ethers are subjected to a stretching treatment. It is practically essential to dilute the dimethylene ethers with non-solvents for the cellulose derivatives owing to their high solvent power, and for this purpose any desired diluents, for example water, benzene, di-isopropyl ether or other diluents with which dimethylene dioxide is miscible in all proportions may be used. The dimethylene ethers may be used alone for the purpose of softening the filaments or other products prior to or during stretching, but in this case it is desirable to apply them in only small quantities, for example by spraying methods or by carrying the filaments or other products into contact with devices supplied with limited quantities of the solvents. The stretching of the softened filaments or other products may be applied in a single operation and preferably gradually, or may be applied in a number of stages, preferably without intermediate elimination of the solvent as described in U. S. application Ser. No. 573,424 filed 6th November 1931. It is particularly advantageous both from the point of view of increasing the regularity of stretch and also for reasons of economy to stretch the filaments or other products while they are in warp formation by applying the stretching force to the warp as a whole. The softening agents may, of course, be removed prior to contact of the filaments or other products with the roller or other device which applies the stretching force, the stretching force then operating from the washed portions of the filaments to the softened portion. Such processes are described in U. S. application Ser. No. 602,844 filed 2nd April 1932.

For the treatment of filaments, yarns and the like of cellulose derivatives, sizes may be made up containing dimethylene ethers so as to effect a lubrication of the yarns or other materials, particularly for facilitating textile operations, such as winding, winding and twisting, beaming and the like. Such sizes may be made up with or without suitable thickening agents, such as water-soluble or dispersible polymerized vinyl compounds, or oxidized linseed oil or other drying oils.

The dimethylene ethers may further be employed in processes involving the absorption of various liquid or solid materials by filaments, yarns, threads, fabrics and the like containing cellulose esters or ethers. For example, such products may be treated with the dimethylene ethers during or before treatments adapted to dye, print, discharge, load, mordant or apply delustring compounds to the materials, the absorption of the dyes, loading agents, mordanting agents, discharges or delustring compounds being facilitated or rendered possible by the aid of these solvents. Thus, for instance, a large number of solid agents have little or no affinity for acetone-soluble cellulose acetate, and by means of the dimethylene ethers such substances may be incorporated in the materials by dyeing, printing, stencilling or mechanical impregnation methods. Examples of such substances include certain basic dyestuffs which have relatively little affinity especially in printing processes, the acid wool and direct cotton dyestuffs, certain vat dyestuffs, white or coloured pigments, for example titanium oxide, and certain discharges, for example the formaldehyde sulphoxylate discharges. Again, dimethylene ethers may be utilized to relustre fabrics or other materials containing cellulose acetate or other esters or ethers of cellulose which have been delustred by the action of moist steam or hot aqueous media, and reference is made in this connection to U. S. Patent No. 1,808,098. The dimethylene ethers may be uniformly applied over the whole fabric or material so as to obtain a uniform relustring, or may be locally applied so as to produce an effect fabric relustred only in the areas to which the dimethylene ethers have been applied. Dyestuffs, pigments, discharges or other effect materials may be included in the relustring printing compositions.

In all the above applications involving the application of the dimethylene ethers to already formed products made of or containing cellulose acetate or other cellulose esters or ethers, it is usually desirable on account of their high solvent power to dilute the dimethylene ethers with suitable diluents which have either no solvent action upon the cellulose derivative or a relatively restricted solvent or softening action, for example hydrocarbon diluents of the aliphatic, aromatic or cyclo-aliphatic series, ethers, alcohols, water and the like. Furthermore, the dimethylene ethers may, of course, be employed in conjunction with other solvents.

In connection with the manufacture and treatment of materials made of or containing cellulose derivatives, cellulose acetate and cellulose nitrate have been more particularly referred to, since commercially these derivatives are by far the more important. However, the invention consists quite broadly in the manufacture and treatment of all cellulose derivatives, for example cellulose formate, cellulose propionate, cellulose butyrate, cellulose nitro-acetate, or other organic esters of cellulose or mixed esters, or ethyl or benzyl cellulose or other cellulose ethers or mixed ethers or mixed ether-esters, for example ethyl cellulose acetate or oxyethyl cellulose acetate.

The following examples illustrate the invention, but it will be appreciated that the proportions of reagents used in these examples are not intended in any way to limit the invention, nor is the invention limited to the applications of the solvent, softening or plasticizing properties of the dimethylene ethers given in these examples.

*Example 1*

A fabric consisting of acetone-soluble cellulose acetate yarns and either delustred or of a normal lustre is printed with the following printing paste:—

| | Parts |
|---|---|
| Dyestuff or pigment | 1– 3.5 |
| Diethylene glycol | 5– 7 |
| Water | 16 |
| 2:4-dimethyl dimethylene dioxide | 20–50 |
| Gum arabic 1:1 | 40–60 |

The dyestuff or pigment may be a typical celluose acetate dyestuff, as for example a dyestuff of the amino anthraquinone series, or a nitro diarylamine or may be an acid wool or direct cotton dyestuff which normally has little or no affinity for the goods, or a pigment may be used, for example titanium oxide. After printing, the fabric is dried and steamed with dry steam in the usual way, and is then washed with warm water, soaped for a few minutes at 40–45° C. in a solution containing 2½ grams of soap per litre and finally rinsed. Where a delustred fabric has been used and the printing paste includes a dyestuff, the lustre of the printed areas is restored.

*Example 2*

Filaments or yarns of cellulose acetate in hank or other suitable form are softened for about 2–5 hours in a bath consisting of a 25–35% aqueous, alcoholic, or aqueous-alcoholic solution of dimethylene dioxide, and after the softening treatment they are very gradually stretched to the desired degree, for example by more than 100% of their original length. As stated, the stretching is preferably carried out gradually, and by providing a bath of suitable length the stretching may be applied to travelling filaments, for example filaments travelling in warp formation.

*Example 3*

A 25% solution of acetone-soluble cellulose acetate in dimethylene dioxide or dimethylene dioxide containing up to 10% of water is spun by ordinary dry spinning methods, the temperature maintained in the spinning cell being of the order of 60–70° C.

*Example 4*

A 25% solution of cellulose acetate in dimethylene dioxide or dimethylene dioxide containing up to 10% of water is extruded through spinning nozzles into a coagulating bath consisting of a 35–40% aqueous solution of dioxane. The soft filaments, after emergence from the coagulating bath, are carried through a guide to a roller rotated at a peripheral speed sufficient to draw the filaments down to very fine deniers. After leaving the feed roller the excess solvent is removed, for example by washing with a dilute solution of methyl glycol mono-acetate, for instance a 10–15% solution, or by washing with a salt solution, for example a 30% solution of sodium sulphate, and the filaments are finally washed with water and dried.

*Example 5*

A 25% solution of cellulose acetate in acetone is extruded in the manner described in the preceding example into a 25–35% solution of 2:4-dimethyl dimethylene dioxide. The spinning is carried out as described in Example 4.

*Example 6*

The following illustrates a lacquer composition capable of producing a highly flexible film or coating particularly suitable for covering rubber insulated cables and the like:—

| | Parts |
|---|---|
| Cellulose acetate | 100 |
| Diphenylol propane formaldehyde resin | 30 |
| Dibutyl tartrate | 200 |
| Tricresyl phosphate | 15 |
| Dimethylene dioxide | 500 |
| Dioxane | 100 |
| Diacetone alcohol | 50 |

*Example 7*

The following illustrates a composition which may be used as a lacquer for coating articles of any kind and which may be used to provide insulation for electrical conductors:—

| | Parts |
|---|---|
| Cellulose acetate | 50 |
| Polymerized vinyl acetate | 50 |
| Diphenylol propane | 35 |
| Dimethylene dioxide | 500 |
| Alcohol | 250 |
| Benzene | 250 |

*Example 8*

A further insulating composition is prepared as follows:—

| | Parts |
|---|---|
| Polymerized vinyl acetate | 100 |
| Diphenylol propane formaldehyde synthetic resin | 45 |
| Tricresyl phosphate | 65 |
| Alcohol | 900 |
| Dimethylene dioxide | 100 |

*Example 9*

A composition consisting of

| | Parts |
|---|---|
| Cellulose acetate | 100 |
| Diphenylol propane formaldehyde synthetic resin | 20 |
| Tricresyl phosphate | 15 |
| Diphenylol propane | 20 |
| Dimethylene dioxide | 500 |
| Methyl acetate | 300 | may be utilized for the same purposes as the composition described in Example 7.

*Example 10*

A further lacquer composition is made up as follows:—

| | Parts |
|---|---|
| Nitrocellulose | 100 |
| Diphenylol propane formaldehyde synthetic resin | 20 |
| Dibutyl phthalate | 20 |
| Triphenyl phosphate | 20 |
| Dimethylene dioxide | 300 |
| Butyl acetate | 700 |

*Example 11*

A plastic mass of cellulose acetate may be made up as follows:—10 parts of tricresyl phosphate together with 25 parts of mono-methylated isomeric xylene sulphonamides are dissolved in a mixture of 50 parts of dimethylene dioxide and 25 parts of benzene and 25 parts of alcohol. The solution is sprayed or otherwise incorporated with about 100 parts of acetone-soluble cellulose acetate and the incorporation is carried out as is usual on malaxating rollers, the solvent being evaporated or allowed to evaporate during the malaxation or afterwards to obtain the plasticized mass which may then be moulded into sheets, plates or other articles, and may be seasoned as usual.

What I claim and desire to secure by Letters Patent is:—

1. Compositions of matter containing lacquer bases and dimethylene ethers of the formula

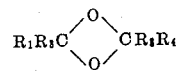

wherein $R_1$, $R_2$, $R_3$ and $R_4$ each represents a hydrogen atom or a lower aliphatic group.

2. Compositions of matter containing cellulose acetate and dimethylene ethers of the formula

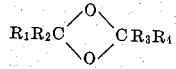

wherein $R_1$, $R_2$, $R_3$ and $R_4$ each represents a hydrogen atom or a lower aliphatic group.

3. Compositions of matter containing organic derivatives of cellulose and dimethylene ethers of the formula

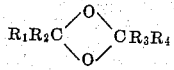

wherein $R_1$, $R_2$, $R_3$ and $R_4$ each represents a hydrogen atom or a lower aliphatic group.

4. Compositions of matter containing cellulose acetate and dimethylene dioxide of the formula

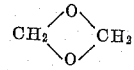

5. Compositions of matter containing organic derivatives of cellulose and 2:4-dimethyl dimethylene dioxide of the formula

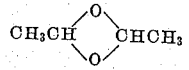

6. Compositions of matter containing cellulose acetate and 2:4-dimethyl dimethylene dioxide of the formula

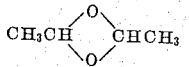

7. Compositions of matter containing organic derivatives of cellulose and 2-methyl dimethylene dioxide of the formula

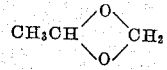

8. Compositions of matter containing cellulose acetate and 2-methyl dimethylene dioxide of the formula

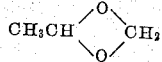

9. In the production of filaments, threads, yarns, ribbons, films, foils, sheets and the like from organic derivatives of cellulose, the step of treating the said cellulose derivatives with dimethylene ethers of the formula

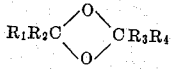

wherein $R_1$, $R_2$, $R_3$ and $R_4$ each represents a hydrogen atom or lower aliphatic group.

10. process for the production of filaments, threads, yarns, ribbons, films, foils, sheets and the like which comprises forming the said products from solutions containing organic derivatives of cellulose and dimethylene ethers of the formula

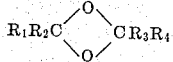

wherein $R_1$, $R_2$, $R_3$ and $R_4$ each represents a hydrogen atom or lower aliphatic group.

11. Process for the production of filaments, threads, yarns, ribbons, films, foils, sheets and the like which comprises forming the said products from solutions containing cellulose acetate and dimethylene dioxide.

12. In the production of filaments, threads, yarns, ribbons, films, foils, sheets and the like from solutions containing organic derivatives of cellulose, the step of coagulating the materials by means of media containing dimethylene ethers of the formula

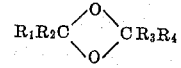

wherein $R_1$, $R_2$, $R_3$ and $R_4$ each represents a hydrogen atom or lower aliphatic group.

13. In the production of filaments, threads, yarns, ribbons, films, foils, sheets and the like from solutions containing cellulose acetate, the step of coagulating the materials by means of media containing dimethylene ethers, of the formula

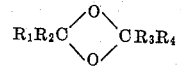

wherein $R_1$, $R_2$, $R_3$ and $R_4$ each represents a hydrogen atom or lower aliphatic group, in relatively high concentration.

14. In the production of filaments, threads, yarns, ribbons, films, foils, sheets and the like from solutions containing cellulose acetate, the step of coagulating the materials by means of media containing dimethylene dioxide.

15. In the treatment of artificial filaments, yarns, threads, films, fabrics and the like containing organic derivatives of cellulose, the step which comprises subjecting the artificial products to the action of media containing dimethylene ethers of the formula

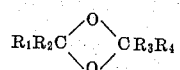

wherein $R_1$, $R_2$, $R_3$ and $R_4$ each represents a hydrogen atom or lower aliphatic group.

16. In the treatment of artificial filaments, yarns, threads, films and the like containing organic derivatives of cellulose, the step which comprises subjecting the artificial products to the action of media containing dimethylene ethers of the formula

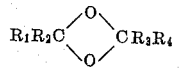

wherein $R_1$, $R_2$, $R_3$ and $R_4$ each represents a hydrogen atom or lower aliphatic group and stretching the materials.

17. In the treatment of artificial filaments, yarns, threads, films, fabrics and the like containing cellulose acetate, the step which comprises subjecting the materials to the action of media containing dimethylene dioxide.

18. In the treatment of filaments, yarns, threads, films and the like containing cellulose acetate, the step which comprises subjecting the materials to the action of media containing dimethylene dioxide and stretching the materials.

HENRY DREYFUS.